United States Patent [19]

Skala

[11] 3,971,040

[45] July 20, 1976

[54] INK DROP PRINTER WITH TRAVERSING ORIFICE BAND

[76] Inventor: Stephen F. Skala, 3839 S. Wenonah, Berwyn, Ill. 60402

[22] Filed: Aug. 20, 1975

[21] Appl. No.: 605,993

Related U.S. Application Data

[63] Continuation-in-part of Ser. No. 421,425, Dec. 3, 1973, abandoned.

[52] U.S. Cl. .......................... 346/75; 346/1; 346/140 R

[51] Int. Cl.$^2$ .................. G01D 15/18; G01D 9/00

[58] Field of Search .............. 346/1, 75, 140, 74; 101/426

[56] References Cited

UNITED STATES PATENTS

| | | | |
|---|---|---|---|
| 3,081,698 | 3/1963 | Childress et al. | 346/74 J X |
| 3,261,284 | 7/1966 | Lynett et al. | 101/114 |
| 3,377,598 | 4/1968 | Borman | 101/426 X |
| 3,383,699 | 5/1968 | Lapinski | 346/74 J |
| 3,582,954 | 6/1971 | Skala | 346/140 X |

*Primary Examiner*—George H. Miller, Jr.
*Attorney, Agent, or Firm*—Dominik, Knechtel, Godula & Demeur

[57] ABSTRACT

A signal responsive printer selectively deposits drops of liquid ink onto an advancing sheet of ordinary paper. A flexible endless band having a plurality of uniformly spaced orifices is drawn through a stationary ink source. Liquid ink emerging under pressure from the orifices forms columns of ink drops which have the linear and constant speed motion of the orifice band. Frictionless constraint of the orifice band is provided by air bearings and noncontacting drive is provided by a linear induction motor acting on the orifice band. Simultaneous printing on both sides of a sheet of paper is attained by a configuration wherein a common orifice band loops through two printers which project selected ink drops toward advancing paper.

7 Claims, 4 Drawing Figures

INK DROP PRINTER WITH TRAVERSING ORIFICE BAND

BACKGROUND OF THE INVENTION

The present application is a continuation-in-part of application Ser. No. 421,425 filed Dec. 3, 1973 and now abandoned.

This invention relates to ink drop printing and more particularly to a method and apparatus for providing a linear traverse for modulated columns of ink drops.

Signal responsive publishing can provide convenient transmission of graphic information, large information capacity, and selection of programming to satisfy individual interests. Of particular value are those methods which permit use of ordinary paper and liquid ink. Among such methods, a category which has suitable characteristics for publishing is ink drop printing wherein liquid ink emerges from a capillary or orifice and forms a modulated column of uniform drops which deposit on moving paper as a graphic image. A survey of this category may be found in "Ink Jet Printing" by F. J. Kamphoefner, IEEE Transactions, ED-19, Apr. 1972, pages 584–593. Several of the ink drop printing methods have demonstrated a degree of resolution adequate for publishing. An ink drop printing method disclosed by R. G. Sweet in U.S. Pat. No. 3,596,275 is representative of methods which form a modulated column of ink drops by selectively removing some of the drops. Another method, sometimes designated asynchronous, forms ink drops selectively. Both of these methods result in a modulated column of ink drops. Particular methods for modulating columns of ink drops are not a subject of the present invention which relates more directly to methods for providing a traversing motion for columns of monodisperse ink drops which may be modulated by any suitable means.

Traversing provides a relative motion between ink drop columns and paper. One traversing method is described, for example, in the cited article by Kamphoefner. An ink drop source remains stationary while paper wrapped around a drum both rotates and advances axially. This method has several apparent deficiencies. One deficiency is that mounting of individual sheets of paper on a drum is inconvenient and precludes automatic unattended printing. Another deficiency is that in a stationary ink drop source, drops are affected by the turbulent wake of preceeding drops. Other methods traverse ink drops along one direction while advancing paper in a perpendicular direction. These methods desireably permit paper to be removed from a roll and to be automatically cut and stacked. One such method disclosed in the cited Sweet patent, has a rotating jet with paper advancing along a concave cylindrical surface. This method desireably provides traverse at constant speed and avoids wake effects, but paper handling is generally complex and printing on both sides of the paper is particularly difficult. A method for printing characters on a flat sheet of paper is disclosed by E. Ascoli in U.S. Pat. No. 3,136,594. A plurality of ink drop sources and deflecting electrodes are mounted on an oscillating bar. The sinusoidal mechanical motion is compensated by an electrostatic sweep to provide a saw-tooth traverse. Paper advances in a direction perpendicular to the motion of the oscillating bar. Such methods, however, would not be suitable for publishing since accurate joining of line segments from different ink drop sources would be difficult.

OBJECTS OF THE INVENTION

It is a general object of this invention to provide an improved signal responsive printer having a rapid printout of high quality.

It is another object to provide a printer wherein modulated columns of ink drops traverse with a linear and constant speed motion across an advancing flat sheet of paper.

It is yet another object to provide an ink drop printer of the type described wherein a minimal number of moving parts is used to improve reliability and economy.

It is still another object to provide an ink drop printer of the type described which simultaneously can print both sides of a sheet of paper.

SUMMARY OF THE INVENTION

These and other objects and advantages which will occur to practitioners are accomplished in accordance with the present invention wherein an endless flexible band having an orifice is drawn through a source of liquid ink which is under pressure. Ink emerging from the orifice forms a column of monodisperse ink drops which has the linear motion and constant speed of the orifice band. Printing speed is increased by a plurality of uniformly spaced orifices so that a column of ink drops begins as another column completes its traverse. Printing speed can be increased further by a plurality of simultaneously operating orifices and a corresponding plurality of stationary selective structures which are disclosed in a copending application. The present invention complements the stationary selective structures with a stationary ink source.

An advancing sheet of paper is printed by printers positioned on both of its sides. A common orifice band loops through both printers and around the paper. This configuration provides the economy of printing both sides of the paper, of use of a single orifice band and its driving means, and of convenient paper handling.

In order to avoid problems of ink leakage and of friction between the ink source and orifice band, air bearings are used to constrain the orifice band. Direct contact with the orifice band is further avoided by use of a linear induction motor which has the orifice band as an armature.

DESCRIPTION OF THE VIEWS OF THE DRAWINGS

Referring now to the drawings, FIG. 1 shows basic components of an ink drop printer with a traversing orifice band.

Figure 1:
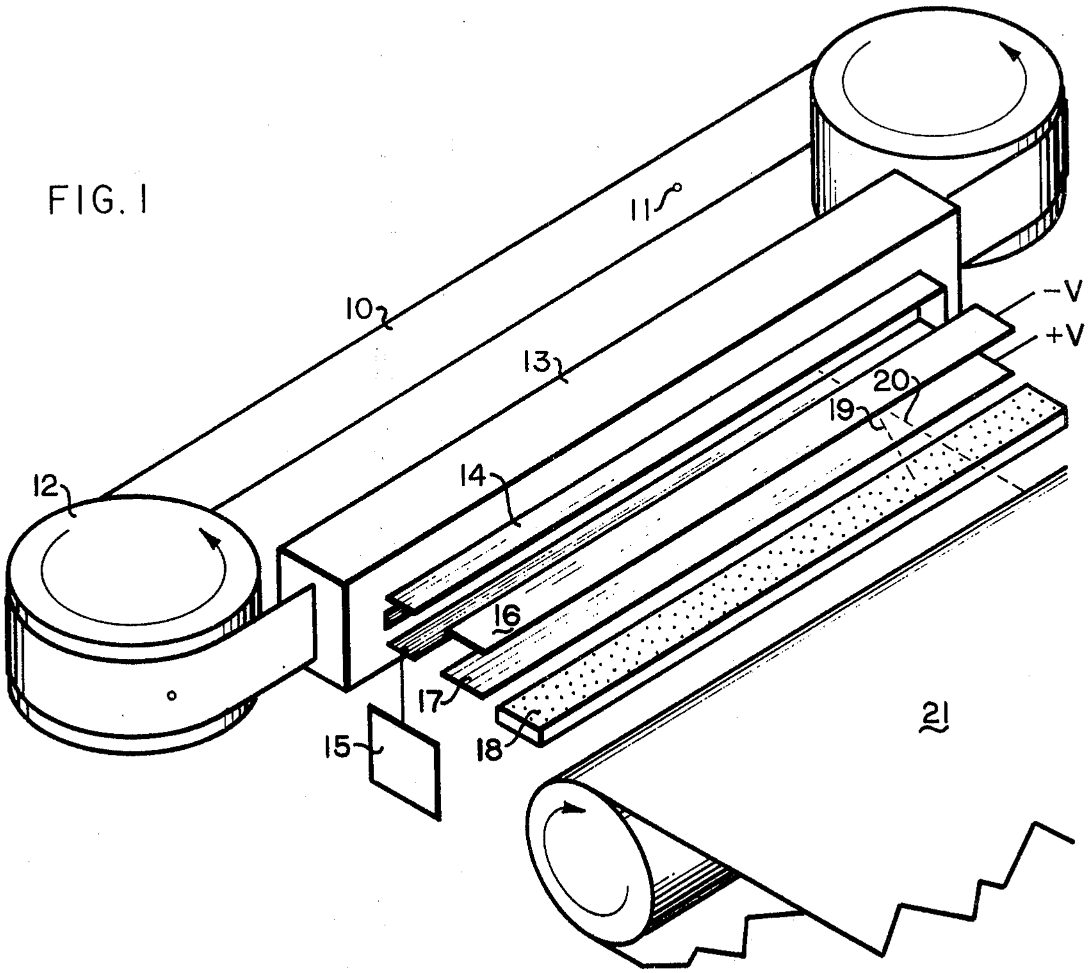
FIG. 1 is a schematic perspective view of an ink drop printer with a traversing orifice band for projecting a modulated column of ink drops toward a paper receiving surface.

A flexible endless orifice band 10 having orifices 11 is advanced by drive pulleys 12 through a stationary ink source 13. Ink under pressure within the ink source emerges as a traversing jet which forms a traversing column of monodisperse ink drops. As the jet passes between electrodes 14 connected to signal source 15, a signal responsive voltage selectively induces an electrostatic charge on the jet and remains as the jet breaks into drops. When a charged drop passes between deflection electrodes 16 and 17, it is deflected into an ink catcher 18 along a deflected trajectory 19. Uncharged ink drops pass undeflected along a trajectory 20 onto paper 21.

Ink drops approaching the paper along a traversing trajectory 20 represent a graphic pattern so that the column of ink drops is modulated. Other methods for modulating columns of ink drops by selectively removing drops from the column, such as are described in the cited copending application, can be adapted to the method of a traversing orifice band.

Figure 2:
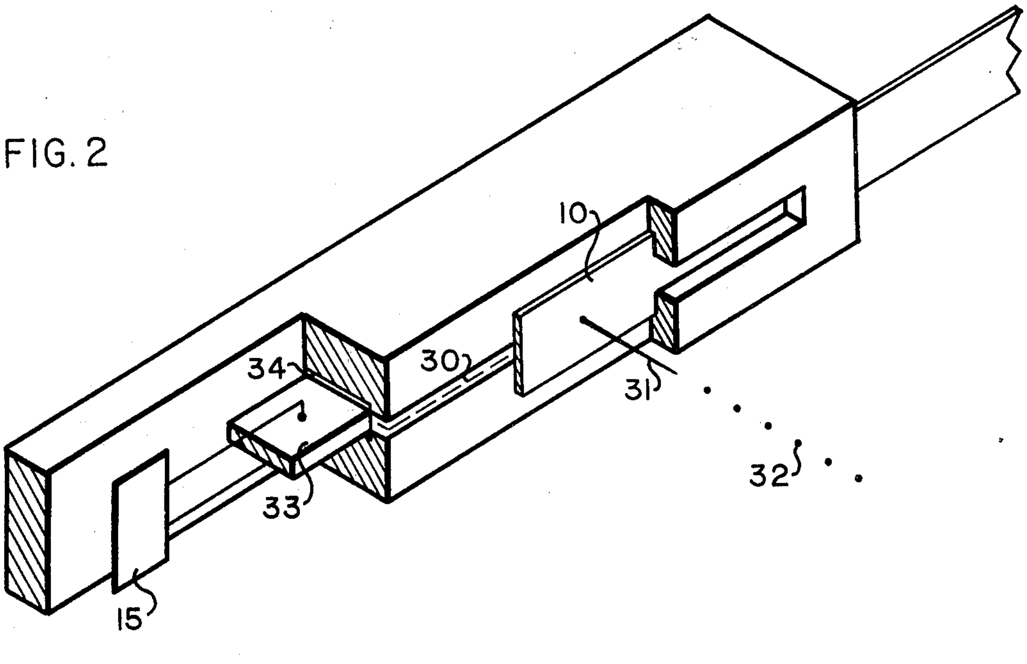
FIG. 2 is a schematic perspective view of a section of another type of ink drop printer with a traversing orifice band wherein ink emerges from an orifice in response to signals.

FIG. 2 shows an alternative method for forming a modulated column of ink drops using an orifice band to provide a traversing motion.

Orifice band 10 is in contact with a body of ink 30 in which pressure is induced in response to a signal. Ink jet 31 emerges from an orifice when the ink is under pressure and breaks into a column of monodisperse drops 32. Pressure pulses are derived from the action of piezoelectric expander plate 33 in response to a voltage from signal source 15. The expander plate, which is set in compliant material 34, expands into the body of ink when a voltage is applied. When the voltage is removed, the expander plate contracts and draws additional ink through a check valve, not shown.

FIGS. 1 and 2 illustrate a basic method of this invention which is the use of a traversing orifice band to provide a constant linear traversing motion for modulated columns of ink drops. The orifice band may be made of any impervious material having sufficient strength to withstand ink pressures. In a subsequent embodiment, electrical conductivity is required and the band is preferably a metal such as steel. Orifices must be uniformly spaced to synchronize with signals and be of uniform size. Methods for fabricating uniform orifices include photochemical etching and laser piercing. A method for desireably dimensioning orifices by electroplating is disclosed by R. P. Taylor in U.S. Pat. No. 3,655.530.

Figure 3:
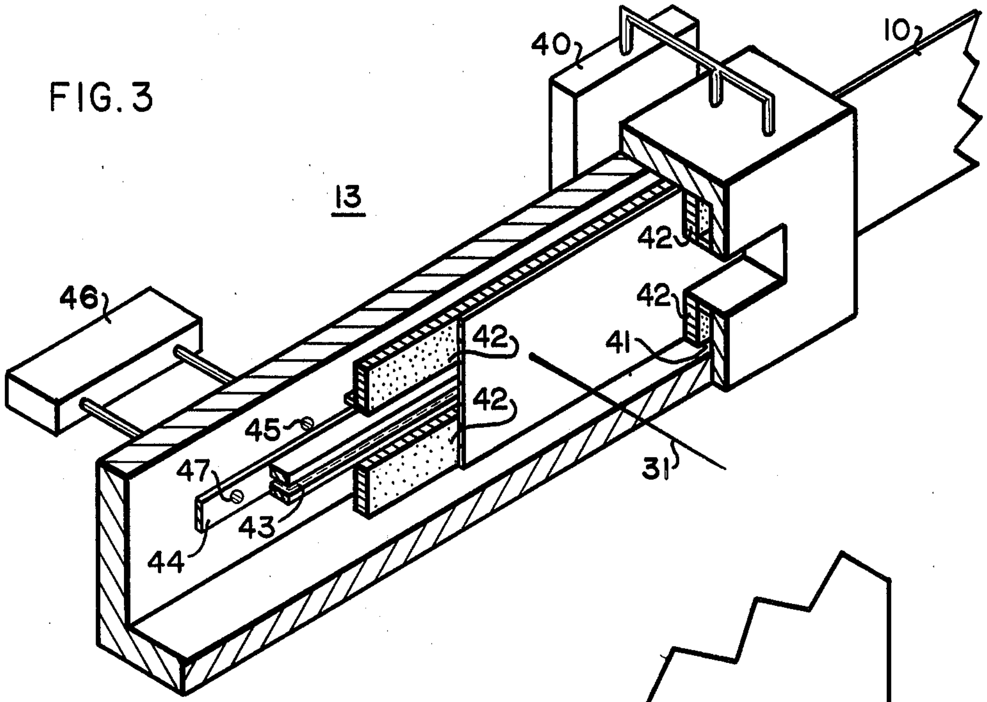
FIG. 3 is a schematic perspective view of a section of a stationary ink source showing air bearings for constraining the orifice band.

FIG. 3 shows components of the stationary ink source in more detail. The stationary ink source constrains the orifice band to a linear path, supplies ink under pressure to all communicating orifices, and induces periodicity on emerging ink jets. The orifice band does not contact any stationary components directly, but is separated by thin fluid films. Air bearings provide friction free support for the orifice band and a seal against ink leakage. Air flowing through an impeding medium is subject to a pressure drop which is proportional to flow. As the orifice band approaches a bearing surface, flow decreases which increases pressure resulting in a stable position. Economical commercial static air bearings are machined from porous sintered metal or carbon materials.

Air under pressure from air pump 40 enters channels 41 behind static air bearings 42 which function as guide members to constrain the orifice band. Orifice band 10 passes between opposing air bearings. An ink channel 43 has on one side a piezoelectric strip 44 which oscillates to induce periodicity on emerging ink jet 31 to assure that ink drops are monodisperse. Ink from the ink channel and air from the air bearing leak around the orifice band and are removed through ports 45. This ink, along with ink from an ink catcher, enters ink pump 46 and is recycled through ports 47 into the ink channel.

Figure 4:
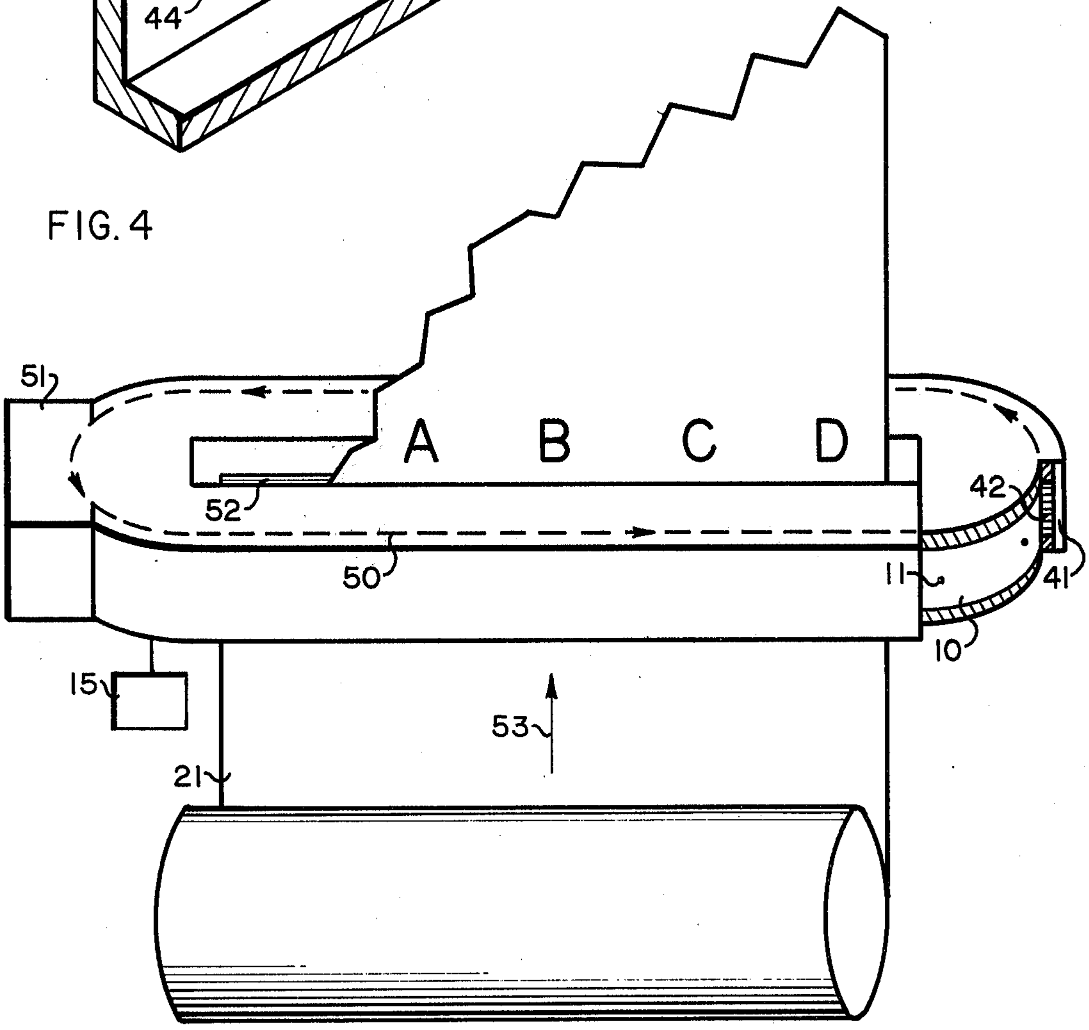
FIG. 4 is a schematic perspective view of an ink drop printer configuration with a common orifice band for printing both sides of a sheet of paper.

In FIG. 4, two ink drop printers are combined with a single orifice band to simultaneously print on both sides of a sheet of paper. The two printers are positioned in an opposing relationship so that modulated columns of traversing ink drops from both printers are directed toward the paper. Air bearings provide support for the orifice band along its path through the stationary members of both printers. The orifice band functions as an armature of a linear induction motor which provides a noncontacting driving force for the orifice band. An absence of direct contact between the orifice band and stationary members has the advantages of an absence of friction assuring continuous motion and a decoupling from ambient noise. Although the configuration of opposed printers with a common orifice band is adaptable to any of the known basic printing methods which form modulated ink drop columns, a preferred embodiment is based on the selectively charged deflected drop printer with transfer members and a plurality of simultaneously operating ink drop trajectories disclosed in the cited copending application.

Orifice band 10 supported by air bearings 42 traverses in the path indicated by 50. A linear induction motor 51 induces currents in the conductive orifice band which couple magnetically to stationary members of the motor to develop a driving force. The motor is controlled by a synchronizing signal from signal source 15 which also provides graphic information for the printer. Details of a signal source are disclosed in a copending application. Modulated traversing ink drops formed from ink emerging from the orifice band project from one of the printers through opening 52 and from a similar opening on the opposite side, not shown, to deposit on paper 21 advancing in the direction indicated by arrow 53.

What is claimed is:

1. A method of printing by selectively depositing ink drops under pressure onto a receiving surface in response to graphic information from a signal source including the steps of positioning a body of liquid ink to contact a portion of a flexible endless band having a plurality of uniformly spaced orifices, moving the orifice band to provide a traversing motion for ink passing through the orifices, said ink forming traversing ink drops which project toward a receiving surface, modulating said ink so that the ink drops approaching the receiving surface deposit thereon in a graphic pattern in accordance with said graphic information from said signal source.

2. The method of claim 1 wherein the step of modulating said ink is characterized by passing ink through all of the orifices in the orifice band which communicate with the body of liquid ink, said passing ink forming traversing columns of ink drops, selectively projecting some of the drops in a trajectory so that said selected drops in said trajectory are deposited in a graphic pattern on the receiving surface, and projecting the remaining drops in another trajectory to prevent deposit on the receiving surface.

3. An apparatus for printing graphic information by depositing drops of liquid ink on a receiving surface, including a flexible endless band having a plurality of spaced orifices, a stationary ink source, guide members for said band within the ink source, means to move said band through said guide members, said guide members constraining the portion of the band which moves therethrough at any time, a body of liquid ink within the ink source, means to develop a pressure within the body of liquid ink so that ink emerges from at least some of the orifices, said ink forming columns of ink drops, and means to modulate said columns of ink drops to thereby form a graphic pattern as the drops deposit on the receiving surface.

4. An apparatus which includes the features of claim 3 wherein said ink emerges as jets from all the orifices in communication with said body of liquid ink, a signal responsive charging electrode to induce an electric charge on the ink jet, said charge remaining on drops formed from said jet, deflecting electrodes having a constant voltage so that drops moving between the deflecting electrodes are deflected in accordance with the electric charge on the drops, an ink catcher to interceptively collect the deflected drops, other drops being deposited on said receiving surface for printing, and means to move the receiving surface.

5. An apparatus which includes the features of claim 3 wherein said guide members are air bearings.

6. An apparatus which includes the features of claim 3 wherein said means to move said band is a linear induction motor.

7. Apparatus for printing by selectively depositing drops of liquid ink under pressure simultaneously on both sides of an advancing sheet of paper including two ink drop printers each having guide members for constraining a traversing orifice band, the two printers being in an opposing relationship to deposit said ink drops on opposite sides of the paper, a single endless orifice band common to the two ink drop printers, means to traverse the orifice band through the two printers, and means to advance said paper between said printers.

* * * * *